June 27, 1950 R. E. ROBERTS 2,513,052
METHOD AND APPARATUS FOR MAKING
HOLLOW PLASTIC ARTICLES
Filed Dec. 11, 1945 4 Sheets-Sheet 1
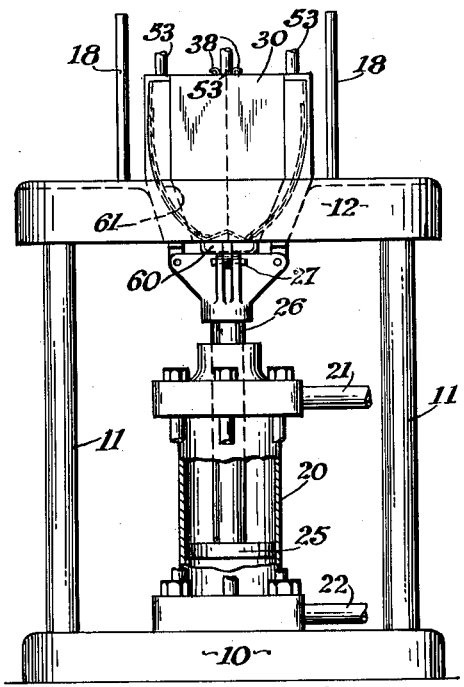
Fig.1
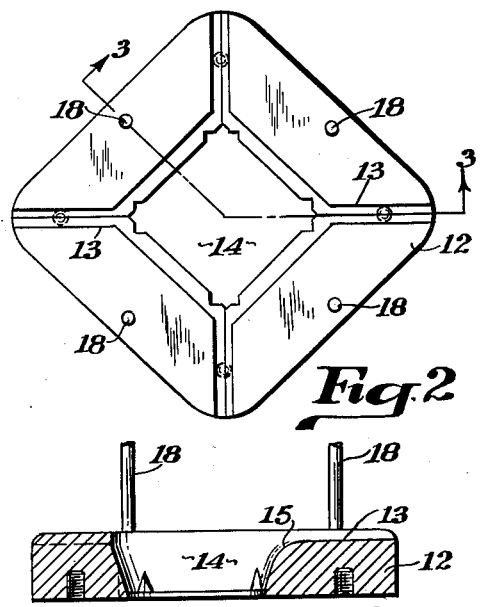
Fig.2
Fig.3
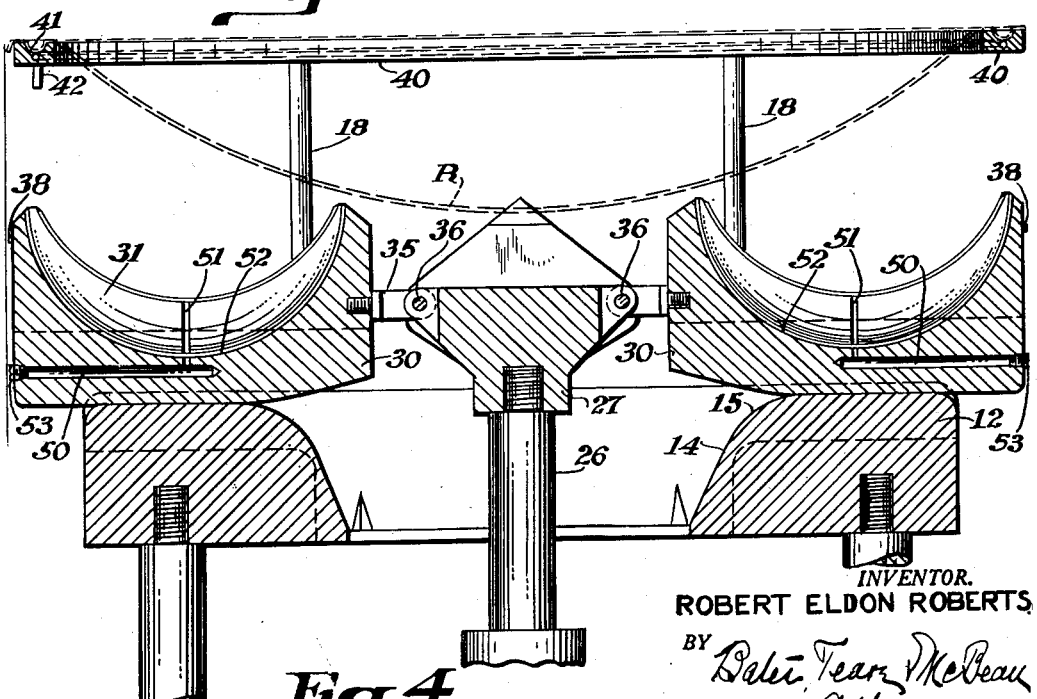
Fig.4
INVENTOR.
ROBERT ELDON ROBERTS
BY
Attorneys

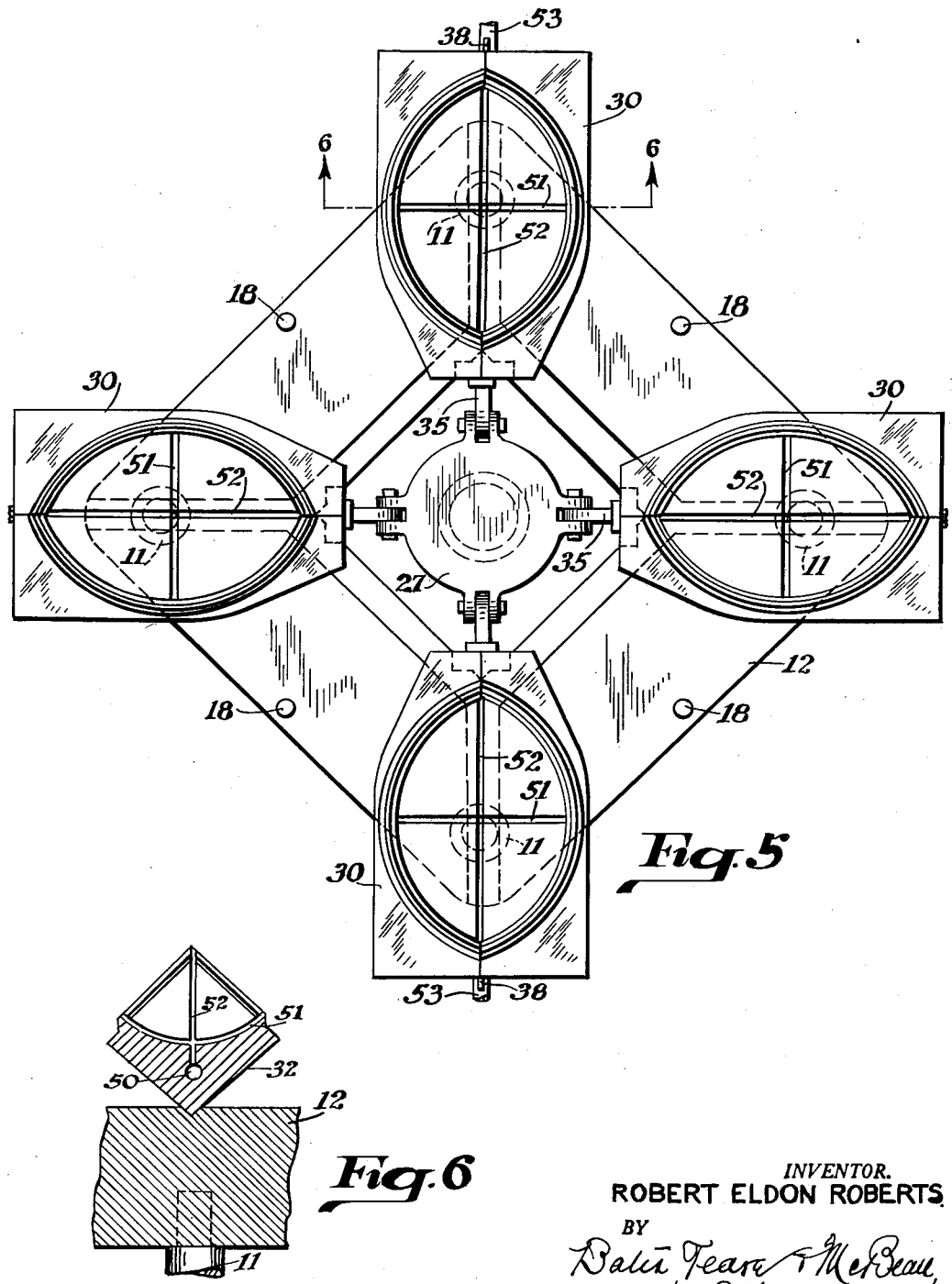

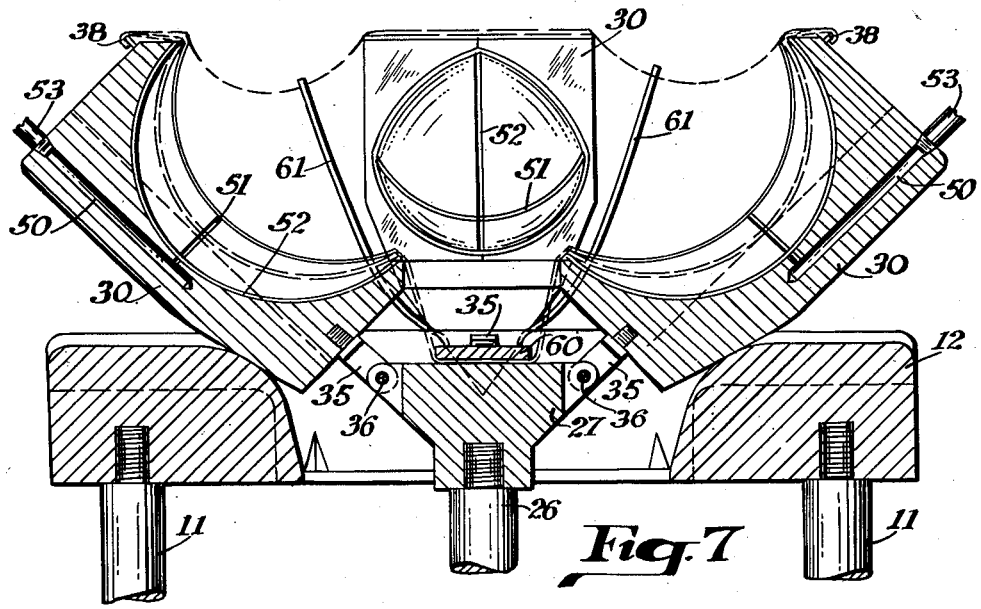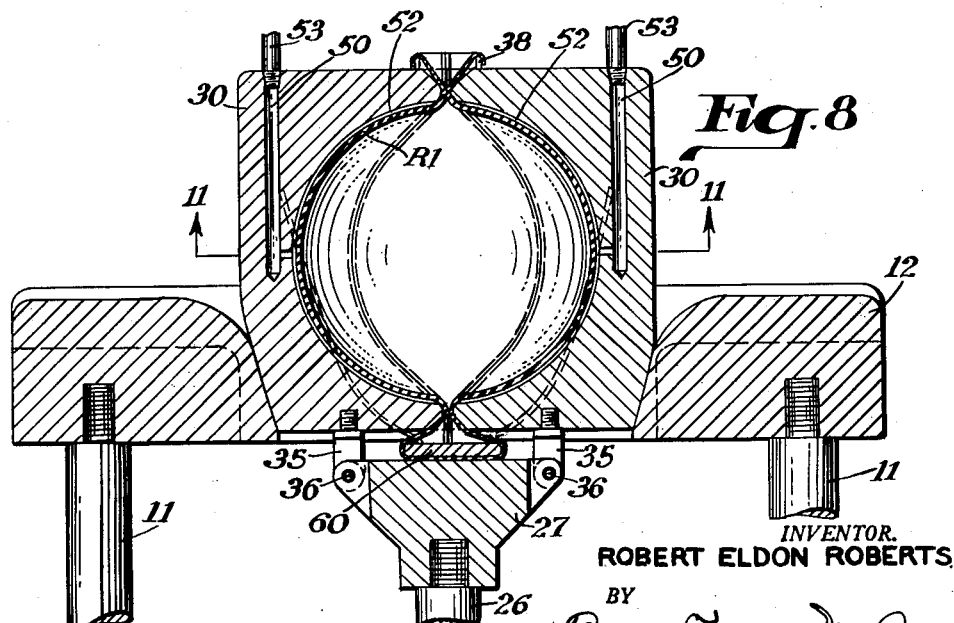

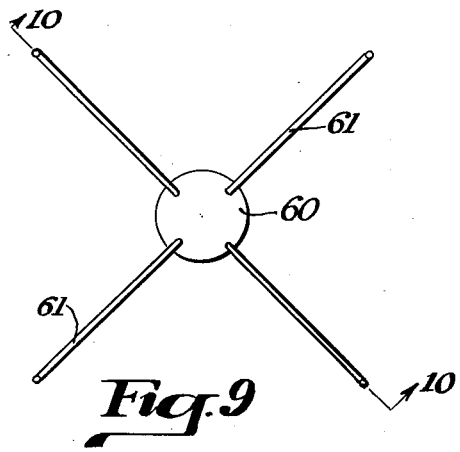
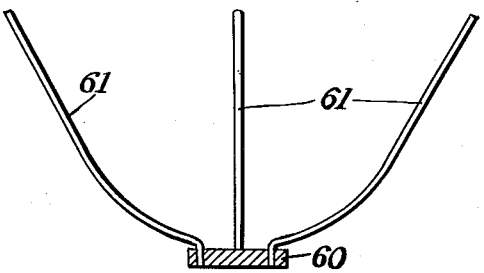
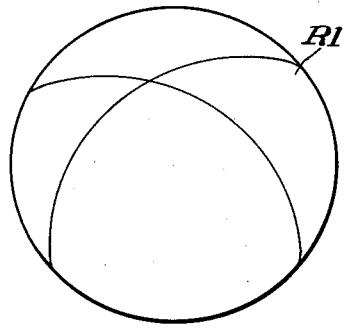
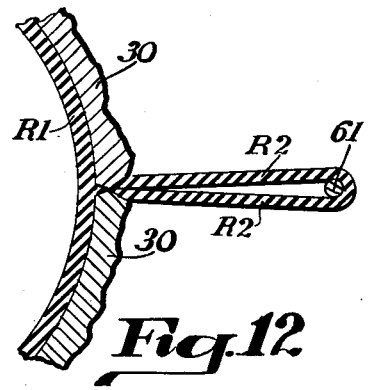
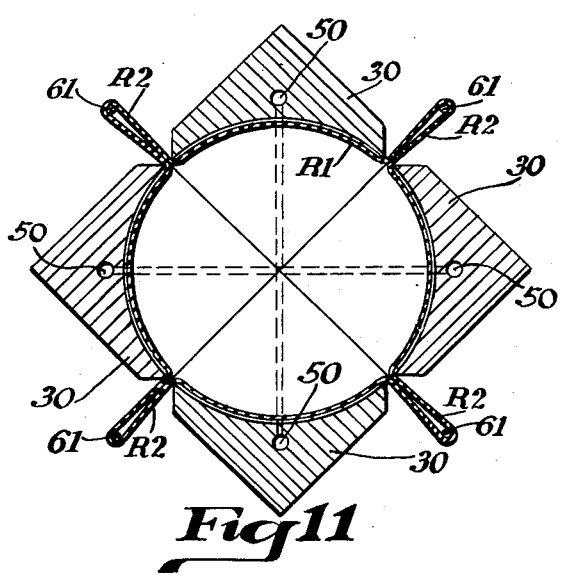

Patented June 27, 1950

2,513,052

UNITED STATES PATENT OFFICE 2,513,052

METHOD AND APPARATUS FOR MAKING HOLLOW PLASTIC ARTICLES

Robert Eldon Roberts, Ridgefield, Conn.

Application December 11, 1945, Serial No. 634,259

25 Claims. (Cl. 18—19)

The object of this invention is to provide a method and apparatus for quickly and cheaply forming hollow articles out of plastic sheet material. The invention is well adapted, for instance, for forming hollow rubber balls or bladders made of sheet rubber.

My method comprises in general the seating of sheet stock in cavities in a series of movable molds, the combined interiors of which are complementary to the exterior of the article to be made, and moving such molds into edge engagement to form a plurality of seams, thus making the complete article. In carrying out this method I provide a series of cavitary molds radiating about a center and having their cavities accessible for the seating of stock in the molds and I provide means for thereafter bringing the various molds into edge engagement under pressure. My invention includes such method and apparatus broadly and also more specifically as hereinafter explained in connection with a preferred form of apparatus illustrated in the drawings.

In the drawings, Fig. 1 is a side elevation partly broken away of a machine for making hollow rubber balls by my method; this view showing the machine in a closed position; Fig. 2 is a plan of the top bed plate of such machine; Fig. 3 is a fragmentary vertical section through the top bed plate in the offset plane indicated by the line 3—3 on Fig. 2; Fig. 4 is a vertical section of the forming portion of the machine in the open position; Fig. 5 is a plan of the parts of the machine shown in Fig. 4; Fig. 6 is a detail in cross section through one of the molds and a portion of the frame, as indicated by the line 6—6 in Fig. 5; Fig. 7 is a vertical section of the forming portion of the apparatus with the molds in an intermediate position, about midway between the open and closed positions; Fig. 8 is a vertical section of a portion of the machine with the molds in closed position; Fig. 9 is a plan and Fig. 10 a vertical section of a suitable device employed in the apparatus to deflect the rubber between the molds; Fig. 11 is a cross section through the four molds closed, as indicated by the line 11—11 in Fig. 8; Fig. 12 is an enlarged view illustrative of any of the four meeting edges of the mold members illustrated in Fig. 11, and Fig. 13 is a perspective of a ball produced by the specific apparatus shown.

The frame of my machine is best shown in Fig. 1, and comprises a base 10, upright posts 11 and a top bed plate 12. Mounted on the base 10 is a cylinder 20 to the heads of which are secured conduits 21 and 22 leading to the upper and lower portion of the cylinder. Within the cylinder is a piston 25 from which a piston rod 26 leads upwardly beyond the cylinder and terminates in a head 27 which operates the various molds.

I have shown four molds 30 each having a cavity 31, the surface of which is a meridional quarter of a sphere, the four molds being thus adapted by edge engagement to define a sphere. That is to say, in each of the four radial molds 30, in the particular embodiment shown, I make a cavity which in the radial direction has a semicircle as its greatest dimension and in the transverse direction a quadrant, so that when the four molds come together the diametrically opposite points of the four molds will all meet at the poles of the sphere while in latitude each cavity will extend one-quarter way around.

The four molds 30 when open extend horizontally and rest on the bed plate 12 of the machine. The molds are preferably triangular on their under sides, as indicated at 32 in Fig. 6, and when open rest in radial grooves 13 in the bed plate 12. The bed plate is formed with a central opening 14 which is substantially square with its points toward the radial grooves 13, with the side walls flaring outwardly and curving over to merge with the top, as indicated at 15 in Figs. 3 and 4.

The four molds 30, resting on the bed 12 in Fig. 4, are connected at their inner ends to the head 27 on the operating plunger 26 by clevises 35 secured to the inner ends of the molds and pivoted at 36 to the head 27. It results from this construction that when the piston rod 26 is pulled downwardly from the position shown in Fig. 4, the molds are rocked inwardly toward each other through gradually closing intermediate positions, one of which is shown in Fig. 7, until the molds come into vertical position where they coact with each other as shown in Figs. 1 and 8.

Briefly, therefore, in the operation of my process, I seat rubber (as hereinafter described in detail) in the different mold cavities and admit fluid under pressure to the pipe 21 at the upper portion of the cylinder to pull down the piston rod, to swing the molds into the vertical positions shown in Fig. 1, thus joining the seated portions to form a hollow sphere of sheet rubber.

Referring now to Fig. 4, 40 indicates a square open frame having a groove 41 in its upper face communicating with a nipple 42 for the attachment of a vacuum conduit. This frame is removable from the machine and when removed to a convenient bench may have a sheet of rubber placed on top of it and the air exhausted through the nipple to seat the margin of the rubber in the groove, the intermediate portion sagging but being sustained across the open space.

The bed plate 12 of the machine is provided with four upright posts 18 and when it is desired to operate the machine the frame 40 with a sheet of rubber clamped at the margin thereof and depending intermediately, as shown at R in Fig. 4, is placed on the posts so that the sheet of rubber extends over all of the four mold members. The vacuum is now released in the groove 41 and the sheet of rubber drops over the mold cavities with the four points of the square sheet outside the outer points of the four cavities. Each point of the sheet is then hooked downwardly manually onto a pin 38 projecting outwardly from each mold member. This anchors the sheet of rubber across the four mold members and over the piston rod head 27, then the frame 40 is removed.

When the sheet of soft raw rubber has been placed as described it sags to some extent into the four mold cavities and may be readily pressed manually to a greater extent thereinto if desired. I now admit some compressed fluid to the upper portion of the cylinder 20 pulling the piston rod downwardly somewhat and rocking the molds approximately into the position in Fig. 7. With the molds in this intermediate position, I desire to seat the rubber accurately and firmly in each mold member according to the contour thereof. To effect this I provide each mold member with a vacuum passageway 50 communicating with a transverse groove 51 and longitudinal groove 52, Fig. 5, in the face of each cavity. The passageway 50 terminates outwardly in a suitable nipple or extension 53 for the attachment of an exhausting conduit. Accordingly, when the air is exhausted through these passageways the rubber extending across becomes accurately seated in each cavity, with very little stretching of the rubber.

I now take the device of Figs. 9 and 10 comprising a disc 60 having four upwardly and outwardly extending spring wires 61, place it on the central region of the raw rubber sheet, and push it down thereon if necessary, until the rubber sheet is brought into contact with the piston rod head 27, as shown in Fig. 7. The wires 61, it will be understood, extend outwardly 45° to the molds, and are thus midway between successive molds.

I now admit further compressed fluid through the pipe 21 to the upper part of the cylinder and swing the molds with the seated rubber into the vertical position shown in Figs. 1, 8 and 11. This brings the edges of the four mold members into conjunction, the wires 61 holding the rubber sheet out of the way in the region between the mold members, but with a light enough pressure so as not to pull the rubber across the rims of the molds.

The edge of each mold member is formed into a V-shaped region, as shown in Fig. 12, and thus when the edges come together they act to pinch the projecting rubber on itself to form an effective seam, and to pinch off the surplus rubber. This is illustrated in Fig. 12 where the rubber portions R¹ at the inner side of two mold members are brought together and the part R² which projects outwardly between the members is pinched together by the edges of the mold formed into an effective seam and the surplus cut off, by the mutual pressure of the mold edges.

The ball, as illustrated in Fig. 13, is now completed and it is only necessary to release the vacuum on the four mold cavities and admit fluid under pressure to the lower portion of the cylinder 20 to swing the molds into open position of Fig. 4 whereupon the completed ball is removed and placed in a spherical vulcanizing mold and vulcanized in the ordinary manner. The excess rubber and the diverting frame 60 are removed and the machine is ready to renew the forming operation when a fresh sheet of raw rubber is placed across the spread molds by the employment of the positioning frame heretofore described.

It will be seen that my machine is comparatively simple in construction and readily operated to manufacture at once a hollow rubber article formed out of sheet rubber by joining portions thereof by a plurality of seams. The article shown is a sphere and the seams produced are meridional seams through the poles in the form of two great circles at right angles to each other. For making other shapes of articles the cavities may be varied accordingly and the number of mold members may be varied, the different members, however, being so formed that each coacts with its neighbor to form a seam when the members are brought into final closed position under pressure.

I claim:

1. The method of making hollow articles having opposed poles from sheet material comprising placing such material across several cavitary mold members, each cavity extending from pole to pole and defining a fraction of the entire surface of the complete article, which fractions add up to one, and bringing said members toward each other to meet at the edges of the cavities to form a plurality of seams.

2. The method of making a hollow rubber article comprising placing raw rubber stock in sheet form across several cavitary molds lying radially about a common center, the cavities being bounded by projecting cutting edges coming to a point at each end and thereafter swinging the molds toward each other to bring the edges of successive molds into coaction throughout their length to form a plurality of seams in the rubber.

3. The method of making a hollow sphere of plastic sheet material comprising arranging several cavitary molds in radial position about a center, each mold having a cavity which in its greatest surface dimension is longitudinally substantially a semi-circle and laterally a fraction of a circle defined by the numeral 1 over a numeral equal to the number of molds, seating the stock in such cavities and bringing the mold members together while holding back the sheet in a region between adjacent mold members to form a sphere having meridional seams extending from pole to pole.

4. The method of making hollow articles circular in cross section from sheet material comprising placing such material across several mold members, each having a cavity concaved longitudinally and transversely, bringing said members toward a common axis and causing the edges of adjacent cavities to meet and form a plurality of seams.

5. The method of making round hollow articles from sheet material comprising placing such material across several radiating mold members each having a cavity concave longitudinally for one-half of a perimeter of the article and concaved transversely for a fraction of the perimeter of the article at right angles to the perimeter first-mentioned, which fraction is expressed by the numeral 1 over the number of molds, and bringing said mold members together to cause each to coact with two others of said mold members located respectively on opposite sides thereof to form a plurality of seams.

6. The method of making a spherical article comprising placing a sheet of plastic stock across several cavitary molds, each cavity having a surface which is a section of a sphere and the cavities being bounded by projecting cutting edges, and thereafter moving the molds toward each other to bring the edges of adjacent molds into coaction to join the stock by a plurality of seams.

7. The method of forming a hollow article of plastic material comprising placing such material in sheet form across a series of molds, each mold being provided with a cavity concaved longitudinally and transversely, seating such stock within the cavities substantially in engagement with the surface thereof, and while the same is seated bringing the mold members into edge-to-edge coaction to form a plurality of seams.

8. The method of forming a hollow article of plastic material comprising placing such material in sheet form across a series of molds, each mold being provided with a cavity complementary to a portion of the article to be produced, exhausting air from such cavities to seat the stock therein, bringing the mold members into edge to edge coaction to form a plurality of seams.

9. The method of forming a hollow article of plastic material comprising placing such material in sheet form across a series of molds, each mold having a cavity which is concave both longitudinally and transversely and is surrounded by a cutting edge, exhausting air from the cavities to seat the sheet stock therein, bringing such mold members together into edge to edge coaction, each with two molds respectively on opposite sides thereof to form a plurality of seams.

10. The method of forming a hollow article of vulcanizable material, comprising placing a single sheet of such material across a series of molds radiating from a common center, each mold being provided with a cavity terminating in a surrounding cutting ridge, such cavity being complementary to a portion of the article to be produced, the sum of the cavities defining the entire exterior of the article, exhausting air from such cavities to seat the stock therein, bringing the mold members into edge to edge coaction to form a plurality of seams, releasing the vacuum, and thereafter removing and vulcanizing the article.

11. The method of making a hollow article from sheet stock comprising placing sheet stock across a series of cavitary molds arranged radially about a center, bringing the mold members into edge coaction while engaging the sheet in the regions between adjacent molds to positively hold back the excess of the sheet as the molds move into final position, the cavities of the set of mold members being formed to define the complete exterior of the article to be produced.

12. The method of making a hollow rubber article from sheet stock comprising placing sheet rubber across a plurality of cavitary molds arranged radially about a center, exhausting the air from the cavities of the mold to seat the rubber therein, bringing the mold members into edge coaction while positively holding back the rubber sheet in the regions between edges of adjacent molds as they move into final position, whereby a closed article with a plurality of seams is formed.

13. The method of making a hollow rubber sphere comprising arranging four cavitary molds in radial position about a center, each mold having a cavity the surface of which is a fraction of a sphere extending longitudinally for substantially a semi-circle and laterally for substantially a quadrant, the edges of the cavities being defined by ridges extending about the cavities, placing a sheet of raw rubber over the various cavities, seating the rubber sheet in each cavity by exhausting the air therefrom, and bringing the mold members together while holding back the rubber sheet in the regions between adjacent mold members to join the rubber by meridional seams extending from pole to pole and located 90° apart at the equator and pinching off the surplus stock and finally vulcanizing the product.

14. An apparatus for forming hollow articles of plastic sheet material comprising a set of cavitary molds, the cavity in each mold being concave longitudinally and transversely and coming to a point at each end, means for supporting the molds so that sheet material may be placed over the cavities, and means for moving the molds toward each other to bring each into edge coaction with two others of the molds for the entire boundary of the cavities to join the material by a plurality of meridional seams.

15. An apparatus for making hollow spheres of plastic sheet material comprising several cavitary molds arranged in radial position about a center, each mold having a cavity which in its surface dimension is longitudinally substantially a semi-circle and laterally a fraction of a circle defined by one over a numeral equal the number of molds, and mechanism for swinging said molds to cause their edges to come into contact throughout the length of the cavity and thereby form a plurality of meridional seams extending from pole to pole of the sphere.

16. An apparatus for making hollow articles of plastic sheet material comprising a set of cavitary molds arranged radially about a center, and means for moving the molds to bring each into edge coaction with two others of the molds, each mold having a cavity which is concave longitudinally and transversely and is such a section of the complete article that when the molds are brought together their cavities enclose the complete article.

17. An apparatus for forming hollow articles of plastic material comprising a set of cavitary molds, the cavity of each molding surface forming a fraction less than half of the entire article, and the sum of the cavities presenting a surface defining a complete closed article, means for supporting the molds in a radial position about an axis, means for exhausting the air from the cavities of the molds to seat stock therein and means for rocking such molds to bring them from stock-receiving position into edge coaction to form a plurality of seams in the article.

18. An apparatus for forming hollow articles having opposed poles from sheet material comprising a set of molds extending radially from a center, each mold having a cavity extending from pole to pole of the article, an operating member at the center to which the molds are pivotally connected back of the inner point of the cavity and means for guiding the molds when they are shifted by the operating member, whereby the molds may be rocked from a spread position into a coacting position of their entire edges.

19. The combination of a frame, a series of molds arranged radially and movably mounted on the frame, said frame being adapted to support the molds with cavities therein facing upwardly, whereby sheet material may be placed over the cavities, means for moving the inner ends of the molds downwardly relative to the frame, and guiding means extending inwardly and downwardly and engaging the underside of the molds, whereby said downward movement of the inner ends results in the rocking the molds inwardly to bring them into edge coaction.

20. The combination of a frame having a bed plate with an opening in it, a set of cavitary molds adapted to rest on the top of the bed plate in radial positions about said opening with the cavities facing upwardly, and means for moving the inner ends of the molds downwardly into the opening in the bed while the bed supports the molds and the edges of said opening form guides along which the molds may travel, thereby rocking the molds with the stock toward each other until the molds come into edge engagement.

21. The combination of a frame having a bed plate with an opening through it, a set of cavitary molds adapted to rest on the bed plate in radial positions about the opening with the cavities facing upwardly, an operating device adapted to extend into the opening and pivotally connected to the molds below the entrance to the inner ends of the cavities, means for seating sheet stock above the molds in the cavities thereof, and means for actuating said operating device to move the inner ends of the molds downwardly into the opening in the bed while the edges of said opening form guides along which the molds may travel, thereby rocking the molds with the stock seated in the cavities toward each other until they come into edge engagement.

22. In an apparatus for forming hollow articles of plastic sheet material, the combination of a series of cavitary molds extending radially about a center and adapted to have a sheet of stock placed across their open faces, means for moving the molds to bring them into edge coaction, and means engaging the sheet of stock outside of the cavities for holding back the excess of the sheet of stock in the regions outside of the cavities and between adjacent molds.

23. The combination of a series of molds arranged radially about a center, means to support the molds with cavities therein facing upwardly, whereby sheet material may be placed over the cavities, a sheet holding device having as many upwardly and outwardly extending arms as there are molds, means for supporting said device at the center and above the sheet stock with the arms extending between molds, and means for rocking the molds as a unit to bring them into coaction, while said device holds back the sheet of material between the molds as they come into coaction.

24. The combination of a frame having a bed plate with an opening therein, a set of molds with upwardly facing cavities, said molds being adapted to rest on the bed plate in a radial position about a center and receive sheet material in their cavities and means for moving downwardly and inwardly the inner ends of the molds into the opening of the bed plate to cause the edges to coact with each other to form a hollow rubber article joined by meridional seams, and a sheet-holding device having upwardly and outwardly extending members to hold back the sheet between the molds.

25. An apparatus for making hollow rubber spheres comprising a frame having a bed plate with an opening therein, a set of four equidistant molds with upwardly facing cavities, each cavity being complementary to one-fourth of a sphere, said molds being adapted to rest on the bed plate in a radial position about a center, means for attaching a sheet of rubber to the molds over the cavities, means for exhausting the air from the cavities to seat the rubber therein, a cylinder, a piston therein having a rod with a head pivotally connected with the inner ends of the molds for moving them downwardly into the opening of the bed plate to rock the molds inwardly and their edges to coact with each other to form a hollow rubber article joined by meridional seams, and a holding device formed for mounting on rubber stock over the piston head and having four upwardly and outwardly extending members projecting between the molds to hold back the rubber between the molds.

ROBERT ELDON ROBERTS.

REFERENCES CITED

The following references are of record in the file of this patent:

UNITED STATES PATENTS

| Number | Name | Date |
| --- | --- | --- |
| 637,372 | Cox | Nov. 21, 1899 |
| 1,270,873 | Robertson | July 2, 1918 |
| 1,467,438 | Lawton | Sept. 11, 1923 |
| 1,497,592 | Roberts | June 10, 1924 |
| 1,639,430 | Gammeter | Aug. 16, 1927 |
| 2,229,613 | Strauch | Jan. 21, 1941 |